March 26, 1935.  R. W. HASTINGS  1,995,805

CONTROL SYSTEM FOR AIR CONDITIONING APPARATUS

Filed Sept. 19, 1933

WITNESSES:

INVENTOR
R. W. HASTINGS.
BY
ATTORNEY

Patented Mar. 26, 1935

1,995,805

UNITED STATES PATENT OFFICE 1,995,805

CONTROL SYSTEM FOR AIR CONDITIONING APPARATUS

Roger W. Hastings, Springfield, Mass., assignor to Westinghouse Electric & Manufacturing Company, East Pittsburgh, Pa., a corporation of Pennsylvania Application September 19, 1933, Serial No. 690,132

3 Claims. (Cl. 236—44)

My invention relates to control systems for air conditioning apparatus and it has for an object to provide an improved system of control, whereby certain elements or combinations of elements to be operated may be easily selected at will.

While not limited to any specific air conditioning system, my invention is more particularly applicable to relatively small unitary systems, commonly referred to as "room conditioners", which include, as a rule, a plurality of air treating elements and a fan for translating air to be treated. The elements to be operated are usually manually selected; the weather conditions dictating the particular elements to be operated.

A further object is to provide a control system, whereby operation of the elements of the air conditioner may be effected automatically, in proper combination.

A further object of my invention is to provide a control system for an air conditioning unit having a switching mechanism so adjusted that operation of the fan alone, or in combination with the air treating devices, may be obtained.

A further object of my invention is to provide a manually adjusted control for air conditioning apparatus to which instruments may be easily applied for automatic operation of certain elements.

It may be desirable to have unit conditioners of the type referred to above, operate automatically in accordance with conditions of the air in the enclosure being conditioned. According to my invention, the electric circuits leading from the switching device to the elements of the conditioner are such that automatic instruments may be easily installed therein, whereby automatic control of the air treating element, which has been manually selected for operation, is obtained.

Figure 1:
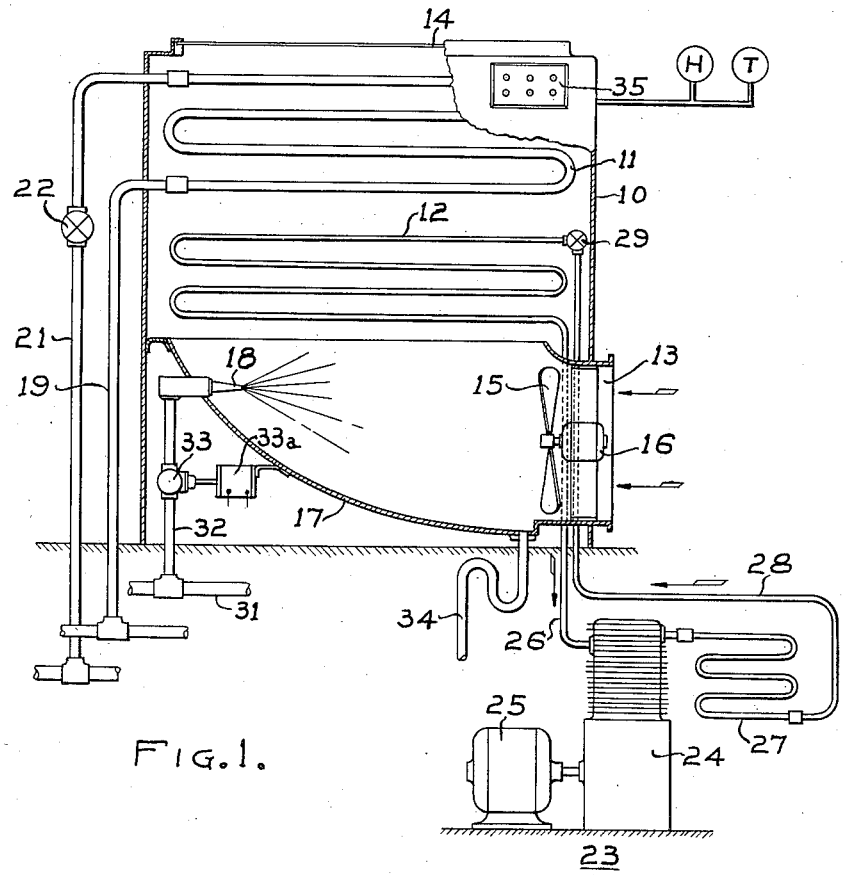
Figure 2:
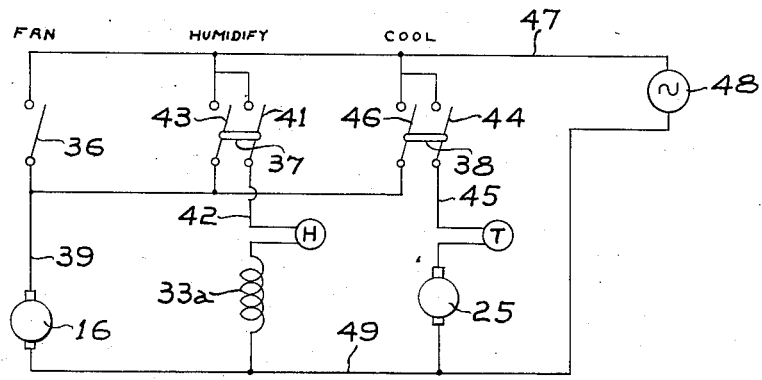

These and other objects are effected by my invention as will be apparent from the following description and claims taken in connection with the accompanying drawing forming a part of this application, in which:

Fig. 1 is a view, somewhat diagrammatic, of an air conditioner having my invention applied thereto; and Fig. 2 is a diagram of electrical connections for the apparatus shown in Fig. 1.

The conditioning apparatus shown in Fig. 1 preferably includes a cabinet 10, within which a radiator 11 and a cooling coil, or evaporator 12 are disposed. Air to be treated enters the cabinet 10 through an inlet opening 13 and is passed over the radiator 11 and cooling coils 12 before being discharged through an opening 14 to the space to be air conditioned. A fan 15 driven by a motor 16 is preferably arranged adjacent the inlet opening 13 for translating air to be treated. The cabinet may further include a duct structure 17 for conveying air therethrough, and a humidifying device, preferably a spray nozzle 18, is disposed within the duct structure 17 in the path of the moving air.

The radiator 11 may be supplied with heating medium such as, for example, hot water through conduit 19 from a suitable source (not shown), and a return pipe 21 conveys the water back to the source. The supply of heating medium to the radiator 11 is controlled by the valve 22.

The cooling coil or evaporator 12 is supplied with refrigerant from any convenient source such as, for example, a refrigerating machine 23 of the compressor-expander type. The latter includes a refrigerant compressor 24, driven by an electric motor 25, and arranged to withdraw refrigerant vapor from the cooling coil 12 through a conduit 26. Refrigerant vapor is compressed in the compressor 24 and discharged into a condenser 27 in which it is cooled and condensed. The liquefied refrigerant is conveyed through conduit 28 to an expansion device 29, where it is expanded into the cooling coil or evaporator 12, abstracting heat therefrom in a well known manner.

The humidifying spray 18, disposed within the duct structure 17, is preferably supplied with water from the building service line 31 through a pipe 32. An electrically-operated valve 33, preferably of the solenoid type, is connected in the pipe 32 and controls the supply of water conveyed thereby. Excess water, discharged by the spray and not vaporized, which may collect in the bottom of the duct 17 is drained away by conduit 34. This conduit 34 will also drain away water precipitated from the air when the cooling coil effects dehumidification.

It will be apparent that all of the foregoing elements are not operated at any one time and that conditions of the air in the room will dictate which of the elements should be operated. During cold weather, the operator will select the radiator 11, the humidifier 18 and the fan 15 for operation, while, in the warm seasons, the fan 15 and the cooling coil 12 will be placed in operation. In order that the various elements may be selected for operation at will, I provide a control system having a switching device 35 conveniently disposed on the cabinet 10. The solenoid valve 33, the fan motor 16, and the compressor motor 25 are electrically connected to the switching device 35, as shown diagrammatically in Fig. 2.

The switching device 35 comprises a bank of switches 36, 37, and 38 which are actuated to select the element or elements to be operated. The switch 36, marked "fan", is connected in the conductor 39 leading to the fan motor 16 and switch 37, designated "humidify", has one pole 41 connected in the conductor 42, leading to the coil 33a of the solenoid valve 33, and a second pole 43 connected in shunt with the "fan" switch 36. The "cool" switch 38 has one pole 44 connected in the conductor 45, leading to the compressor motor 25 and a second pole 46 connected in shunt with the "fan" switch 36.

A common conductor 47 leads from one terminal of the power source 48 to one side of each of the switches 36, 37, and 38, and the other terminal of the power source 48 is directly connected by conductor 49 to the fan motor 16, the valve coil 33a and the compressor motor 25.

When air circulation alone is required the "fan" switch 36 is closed to complete a circuit from the power source 48 through the fan motor 16. This circuit may be traced from power source 48, conductor 47, switch 36, conductor 39, fan motor 16, and conductor 49 to the power source 48. The fan motor 16 now operates to draw air through the inlet opening 13 and force the same, without treatment, through the outlet 14 to the space being ventilated. It will be understood that the valve 22 will be closed under these conditions. Should heating be required, the valve 22 will be opened to admit heating medium to the radiator 11 so that the air passing through the cabinet structure 10 will be heated prior to its delivery through the outlet opening 14.

When humidification is required, the switch 37 is closed to energize the coil 33a of the valve 33. This energizing circuit may be traced from the power source 48, conductor 47, pole 41 of the switch 37, conductor 42, coil 33a, conductor 49 back to the power source 48. Energization of the coil 33a opens the valve 33 so that water will now flow from the service pipe 31, through the pipe 32 to the spray nozzle 18. The pole 43 of the switch 37 closes simultaneously with the closing of the switch pole 41 so that a shunt circuit around the fan switch 36 is established. The fan motor 16 will continue to operate regardless of the position of the fan switch 36, as long as switch 37 is closed. Air conveyed by the fan 15 will contact the spray produced by the spray nozzle 18 so that humidification of the translated air is effected. The air temperature is then raised by contact with the radiator 11 before passing through the outlet 14. Excess water, sprayed by the nozzle 18 and not taken up by the air in the form of vapor, may drop to the bottom of the duct structure 17 to be drained away by the conduit 34 to a point of discharge.

During the warm seasons, when cooling is desirable, the switch 38 will be closed, the switch 37 opened, and the valve 22 closed. As both poles 44 and 46 of the switch 38 close together, a pair of circuits are established, one of which is a shunt circuit around the fan switch 36 so that operation of the fan 15 is assured regardless of the position of switch 36, as long as the switch 38 remains closed. The remaining circuit is completed by pole 44 to the compressor motor 25. This circuit may be traced from the power source 48, conductor 47, pole 44, conductor 45, motor 25 to the source of power 48. Operation of the refrigerating machine 23 is initiated, so that refrigerant will now be circulated through the cooling coil or evaporator 12 for abstracting heat therefrom. Air translated by the fan 15 is passed in heat exchanging relation with the cooling coil 12, so that its temperature will be depressed before being discharged through the opening 14. Moisture which may condense on the cooling coil 12 drops to the bottom of the duct 17 and flows through conduit 34 to a point of discharge.

From the foregoing, it will be seen that operation of either the humidifying means or the cooling means is accompanied by operation of the fan, and that the latter may be operated independently of the humidifying or cooling means. It will be apparent that this is a desirable arrangement as it would be undesirable and inefficient to have either of the air treating means operating without air circulation.

The foregoing description applies to a system manually controlled throughout. It may be desirable to apply automatic controls to govern the operation of the air treating means and, in order that this may be accomplished, a humidistat H and a thermostat T are connected in the electrical circuits. As these instruments are old in the art, no description will be necessary except that electrical contacts are opened and closed thereby in response to changes in air conditions. These instruments may be easily applied to my novel control circuit; the preferable arrangement being to insert the humidistat H in the conductor 42, and the thermostat T in the conductor 45. These instruments are so disposed, as shown in Fig. 1, that changes in air conditions in the space to be air conditioned are reflected therein.

When the switch 37 is closed, the coil 33a will be energized only during the period when the contacts of the humidistat H are closed, due to the absence of sufficient moisture in the air. When the air has been sufficiently humidified, the humidistat H opens its contacts to deenergize the coil 33a and the supply of water to the nozzles 18 is discontinued. It will be seen, however, that deenergizing the circuit of the coil 33a by the opening of the contacts of the humidistat H, has no effect on the operation of the fan as the latter is in an independent circuit. Likewise when the "cool" switch 38 is closed, the motor 25 of the refrigerating machine 23, is under control of the thermostat T and operates only when the contacts of the latter are closed, which is during periods when cooling is required. When the temperature of the air in the space being conditioned falls to a predetermined degree, the thermostat T opens its contacts and terminates operation of the motor 25. As the fan motor 16 is connected in an independent circuit, it will continue to operate to circulate air.

From the foregoing, it will be seen that I have devised a control for air conditioning apparatus in which operation of the fan or air translating means is maintained during times when the air treating devices are active and that operation of the fan may be effected independently of the air treating devices. It will be apparent that air treating devices other than the cooling coil 12 and the humidifying spray nozzles 18 may be controlled, as these have been disclosed by way of example.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. A control system for apparatus for conditioning air in an enclosure, the combination of a fan for conveying air to the enclosure, means for humidifying said air, means for cooling said air, electrical circuits for the fan, humidifying means and air cooling means, respectively, a first switch for controlling said fan circuit, a second switch for controlling the fan and electrically connected in said humidifying means circuit, and a third switch for controlling the fan and electrically connected in said air cooling means circuit, whereby the fan circuit is energized when any one of said switches is closed.

2. In a control system for air conditioning apparatus, the combination of a fan for translating air to be treated, means for humidifying said air, means for cooling said air, electrical circuits connected to the fan, humidifying means and air cooling means, respectively, a switch for controlling the energization of said fan circuit, a second switch having one pole for controlling the energization of said humidifying means circuit and a second pole connected in shunt with said fan switch, a third switch having one pole for controlling the energization of said cooling means circuit and a second pole connected in shunt with said fan switch.

3. In a control system for air conditioning apparatus, the combination of a fan for translating air to be treated, means for humidifying said air, means for cooling said air, electrical circuits connected to the fan, humidifying means and air cooling means, respectively, a switch for controlling the energization of said fan circuit, a second switch having one pole for controlling the energization of said humidifying means circuit and a second pole connected in shunt with said fan switch, a third switch having one pole for controlling the energization of said cooling means circuit and a second pole connected in shunt with said fan switch, a humidistat connected in the circuit of the humidifying means, and a thermostat connected in the circuit of the air cooling means.

ROGER W. HASTINGS.